US012671083B2

(12) United States Patent
Hadidi et al.

(10) Patent No.: US 12,671,083 B2
(45) Date of Patent: Jun. 30, 2026

(54) METHOD FOR PREPARING LITHIUM METAL PHOSPHATE (LMP) CATHODE MATERIALS

(71) Applicant: Nano One Materials Corp., Burnaby (CA)

(72) Inventors: Lida Hadidi, Burnaby (CA); Stephen A. Campbell, Burnaby (CA); Adam John Seip, Burnaby (CA)

(73) Assignee: NANO ONE MATERIALS CORP., Burnaby (CA)

(*) Notice: Subject to any disclaimer, the term of this patent is extended or adjusted under 35 U.S.C. 154(b) by 720 days.

(21) Appl. No.: 18/097,754

(22) Filed: Jan. 17, 2023

(65) Prior Publication Data

US 2023/0238516 A1 Jul. 27, 2023

Related U.S. Application Data

(60) Provisional application No. 63/301,767, filed on Jan. 21, 2022.

(51) Int. Cl.

| | |
|---|---|
| ***H01M 4/36*** | (2006.01) |
| ***C01B 25/45*** | (2006.01) |
| ***H01M 4/02*** | (2006.01) |
| ***H01M 4/525*** | (2010.01) |
| ***H01M 4/587*** | (2010.01) |

(52) U.S. Cl.

CPC ............. *H01M 4/366* (2013.01); *C01B 25/45* (2013.01); *H01M 4/525* (2013.01); *H01M 4/587* (2013.01); *C01P 2002/52* (2013.01); *C01P 2002/72* (2013.01); *C01P 2004/80* (2013.01); *C01P 2006/40* (2013.01); *H01M 2004/028* (2013.01)

(58) Field of Classification Search

CPC ..................................................... H01M 4/366

See application file for complete search history.

(56) References Cited

U.S. PATENT DOCUMENTS

| | | | | |
|---|---|---|---|---|
| 7,491,468 | B2 | 2/2009 | Okada et al. | |
| 7,892,676 | B2 | 2/2011 | Yang et al. | |
| 9,321,648 | B2 | 4/2016 | Yu et al. | |
| 11,021,367 | B2 | 6/2021 | Kang et al. | |
| 11,476,462 | B2 | 10/2022 | Chou et al. | |
| 2010/0102270 | A1* | 4/2010 | Jia | H01M 4/136 252/182.1 |
| 2012/0032119 | A1* | 2/2012 | Tahara | C01B 25/45 423/306 |
| 2020/0168909 | A1* | 5/2020 | Talebiesfandarani | H01M 10/052 |

FOREIGN PATENT DOCUMENTS

| | | | |
|---|---|---|---|
| CN | 113942988 | A | 1/2022 |
| EP | 2 098 483 | A1 | 9/2009 |

* cited by examiner

*Primary Examiner* — William D Young

(74) *Attorney, Agent, or Firm* — Gowling WLG (Canada) LLP

(57) ABSTRACT

An improved process for forming a lithium metal phosphate cathode material is provided. The process comprises reacting a metal source, a phosphate containing acid such as phosphoric acid, and an organic acid in solvent to form a metal phosphate. A lithium source is added to the solvent and a precipitate is allowed to form. The precipitate is dried and calcined thereby forming lithium iron phosphate cathode material wherein the lithium iron phosphate cathode material comprises up to 3 wt % carbon.

49 Claims, 6 Drawing Sheets

METHOD FOR PREPARING LITHIUM METAL PHOSPHATE (LMP) CATHODE MATERIALS

CROSS-REFERENCE TO RELATED APPLICATIONS

The present application claims priority to U.S. Provisional Patent Application No. 63/301,767 filed Jan. 21, 2022 which is incorporated herein by reference.

FIELD OF THE INVENTION

The present invention is related to lithium metal phosphate $LiMPO_4$ (LMP) cathode material wherein M represents Fe, Mn, Ni or Co and combinations thereof. The present invention is also related to improved methods for the synthesis of LMP. More specifically, the present invention is related to the synthesis of a particularly preferred LMP, which is $LiFePO_4$ (LFP), cathode material from low cost materials. Even more preferably the present invention is related to the improved synthesis of LMP, and particularly, LFP, comprising carbon preferably as a coating.

BACKGROUND

LMP, and more specifically LFP, is a widely used cathode material for lithium ion batteries. LFP is synthesized commercially by either a solid-state process or a hydrothermal process both of which require multiple time-consuming steps or costly precursors. Both the solid-state process and the hydrothermal process are known to form undesirable impurities. The final cathode material is typically coated with a carbon source to increase electrical conductivity thereby forming material referred to in the art as $LiFePO_4/C$ which represents carbon coated lithium iron phosphate with the understanding that the stoichiometry of the carbon is not represented in the shorthand notation $LiFePO_4/C$ or the corresponding notation LFP/C. For the purposes of this disclosure the notation LMP/C is an analogous notation referring to $LiMPO_4/C$ which is a carbon coated lithium metal phosphate.

The solid-state process requires a homogenous mixture with uniform particle distribution. Uniform particle distribution is difficult to achieve on a manufacturing scale. Mechanically mixing and grinding a large volume of solids at high temperature is a difficult process to control in an industrial environment resulting in the formation of undesirable impurities.

The hydrothermal method requires excess LiOH and produces $Li_2SO_4$ waste as a by-product. Lithium hydroxide is a relatively expensive source of lithium and $Li_2SO_4$ is an undesirable by-product which requires recycling. The necessity for recycling $Li_2SO_4$ complicates the overall manufacturing process and increases cost. The hydrothermal method also requires the use of a high pressure autoclave reactor at high temperature which is a costly process at high volumes.

Even with the difficulty associated with the synthesis, LFP is still widely accepted across the globe as a preferred cathode material for batteries. Growth in lithium ion batteries, particularly with a LFP cathode, is expected to grow. Due to the continued awareness of the environmental impact for manufacturing processes, and the cost and difficulty associated with the synthesis of LFP, those of skill in the art have had a long standing desire for a synthetic method which can use lower cost feedstocks and require less processing. An improved synthetic process is provided herein.

SUMMARY OF THE INVENTION

The present invention is related to an improved process for the manufacture of cathode materials comprising lithium metal phosphate further comprising carbon, preferably as a coating, and more particularly comprising lithium iron phosphate comprising carbon, preferably as a coating.

More specifically, the present invention is related to a process for the synthesis of lithium iron phosphate/carbon (LFP/C) materials using lower cost feedstock or starting materials.

A particular feature of the invention is the ability to manufacture $LiFePO_4/C$ from elemental iron or a source comprising zero-valent iron such as steel.

These and other embodiments, as will be realized, are provided in a process for forming a lithium metal phosphate cathode material. The process comprises forming a lithium metal phosphate cathode material comprising:

- reacting a metal source, phosphate containing acid and an organic acid in solvent to form a metal phosphate;
- adding a lithium source to the solvent;
- allowing a precipitate to form;
- drying the precipitate; and
- calcining the precipitate thereby forming the lithium iron phosphate cathode material wherein the lithium iron phosphate cathode material comprises up to 3 wt % carbon.

Yet another embodiment is provided in a process for forming a lithium metal phosphate cathode material comprising:

- reacting a metal source, phosphoric acid and an organic acid in solvent to form a metal phosphate;
- adding a lithium source to the solvent;
- allowing a precipitate to form;
- drying the precipitate; and
- calcining the precipitate thereby forming the lithium iron phosphate cathode material wherein the lithium iron phosphate cathode material comprises up to 3 wt % carbon.

DESCRIPTION

Figure 1:
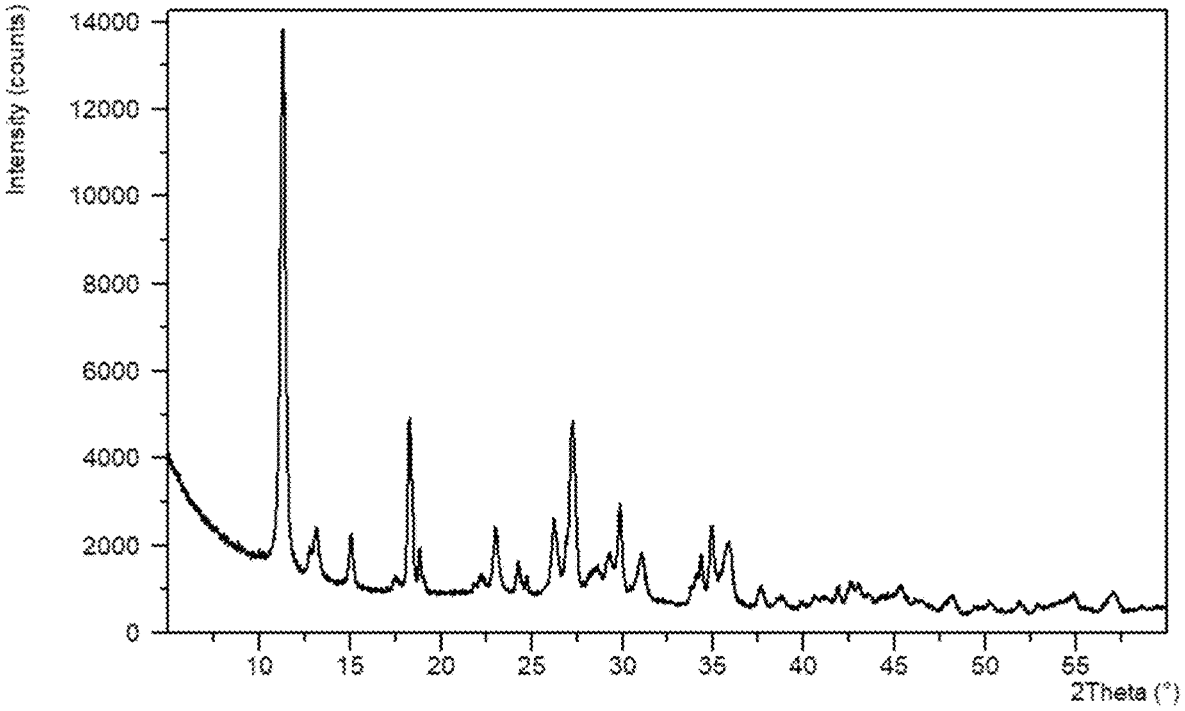
FIG. 1 is an x-ray diffraction (XRD) pattern of precursor material.

The present invention is related to an improved synthesis of LMP/C, and more specifically $LiFePO_4/C$, utilizing lower cost feedstock and minimal processing. More specifically, the present invention is related to a process for forming $LiFePO_4/C$ using elemental metal, or metal in a zero oxidation state, such as directly from iron or alloys comprising iron such as steel.

The method for synthesizing $LiMPO_4$ utilizes the reaction of the metal source with a phosphate containing acid and an organic acid, preferably in a solvent and most preferably water, to form metal phosphate, and preferably iron phosphate. A lithium source, such as lithium carbonate or lithium hydroxide is then added followed by drying and calcining. The organic acid provides carbon thereby forming $LMPO_4/C$ and preferably $LiFePO_4/C$ which is a particularly suitable cathode material for lithium ion batteries.

The process is described herein particularly for the formation of lithium iron phosphate, for convenience, with the understanding that iron can be replaced on an equal molar basis with nickel, manganese, cobalt, or combinations thereof to achieve, by the same process, an olivine lithium metal phosphate preferable comprising carbon, preferably as a coating, wherein the lithium metal phosphate or LFP has the general formula:

$$LiFe_xNi_aMn_yCo_zPO_4 \text{ wherein } x+a+y+z=1$$

wherein:

$0\leq x\leq 1$ more preferably $0.5\leq x\leq 1$ and most preferably $0.9\leq x\leq 1$;

$0<y\leq 1$ more preferably $0\leq y\leq 0.5$;

$0<z\leq 1$ more preferably $0\leq z\leq 0.5$; and $0<a\leq 0.1$.

Carbon, preferably as a coating, is desirable to obtain good electrochemical performance such as electrical conductivity, tap density, lithium ion diffusion, optimum particle size and phase purity. Carbon content also controls crystal growth of the LMP during calcination with particle size being inversely correlated to carbon content. The tap density is also inversely correlated to carbon content. Furthermore, at high carbon content impurities appear due to the reduction of iron. If the carbon content is insufficient impurities are formed due to the oxidation of iron. A final carbon content in the $LMPO_4/C$ of at least 1 wt % to no more than 3 wt % is preferred to achieve optimum conductivity with sufficient tap density and particle size. Most preferably the carbon content in the $LMPO_4/C$ is at least 1.3 wt % to no more than 2.5 wt % with 1.4 to 1.7 wt % being most preferred. Above about 2 wt % carbon content in the $LMPO_4/C$ the electrical conductivity is not appreciably improved and as the carbon coating thickness increases the lithium ion diffusion rate can be compromised. For these reasons, and to maximize tap density, it is preferable to limit carbon content in the $LMPO_4/C$ to no more than approximately 2 wt % and more preferably no more than approximately 1.7 wt %.

The method of synthesis includes the following steps. A metal source, preferably comprising iron, is combined with a phosphate containing acid which is preferably an aqueous solution comprising phosphoric acid. It is preferable to do the reaction in water and therefore a 40 wt % phosphoric acid solution can be employed without limit thereto. It is preferable to minimize the water to minimize the amount of water removed during drying. An organic acid is preferably added before, after or in concert with the phosphoric acid with citric acid or oxalic acid being preferred. The reaction product of the metal source, phosphoate containing acid and organic acid is a metal phosphate. With iron as the preferred metal the iron is predominantly, and most preferably exclusively, in the +2 oxidation state.

The metal source can be elemental metal, particularly elemental iron, or an alloy comprising zero-valent metal such as steel.

In an alternate embodiment the metal source is reacted with oxalic acid followed by the addition of phosphate containing acid such as phosphoric acid to form the metal phosphate.

The phosphate containing acid is preferably phosphoric acid or a phosphate ester represented by:

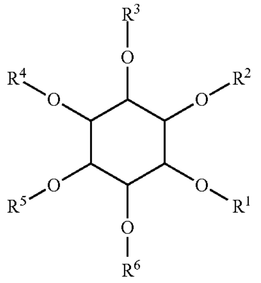

wherein:

each of $R^1$-$R^6$ is independently selected from H and $—PO(OR^7)_2$ wherein each $R^7$ is independently selected from H, substituted or unsubstituted alkyl of 1-20 carbons, substituted or unsubstituted aryl of 6-20 carbons or an alkylaryl of 7-21 carbons; with the proviso that at least one of $R^1$-$R^6$ is $—PO(OH)_2$. Preferably at least two of $R^1$-$R^6$ is $—PO(OH)_2$. More preferably at least three of $R^1$-$R^6$ is $—PO(OH)_2$. More preferably at least four of $R^1$-$R^6$ is $—PO(OH)_2$. More preferably at least five of $R^1$-$R^6$ is $—PO(OH)_2$. Most preferably each of $R^1$-$R^6$ is $—PO(OH)_2$ wherein the phosphate ester is phytic acid which is particularly preferred. $R^7$ can be an unsubstituted alkyl, aryl or alkylaryl or $R^7$ can be an alkali metal preferably selected from lithium, sodium and potassium and preferably lithium.

A lithium source is added to the metal phosphate with preferred lithium sources being lithium carbonate or lithium hydroxide.

It is preferable that the metal, particularly iron, remain in the +2 oxidation state and preferably with iron the metal phosphate is at least 50 wt % $Fe_3(PO_4)_2$, more preferably at least 75 wt % $Fe_3(PO_4)_2$, and most preferably at least 90 wt % $Fe_3(PO_4)_2$.

It is preferable to utilize conditions which inhibit the formation of $Fe^{+3}$ such as formation of the iron phosphate at low temperatures such as below about 90° C., or in an non-oxidizing atmosphere comprising low levels of oxygen such as an inert gas with nitrogen being preferred due to cost considerations.

When oxalic acid is used the metal forms an oxalate such as iron oxalate. When oxalic acid is used it is preferable to utilize a reducing acid, such as citric acid, to mitigate oxidation of $Fe^{2+}$ to $Fe^{3+}$. A reaction temperature above about 60° C. is particularly preferred when oxalic acid is used in combination with citric acid.

Particularly preferred carbon sources are organic acids, particularly carboxylic acids, and more particularly di-carboxylic acids or tri-carboxylic acids. Di- and tri-carboxylic acids with less than about 10, preferably alkyl, carbon atoms are most preferred. Particularly preferred acids are selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, isocitric acid, aconitic acid, propane-1,2,3-tricarboxylic acid and sucrose. Citric acid and oxalic acid are preferred due to their low cost and wide spread availability. Particularly suitable carbon sources include oxalic acid, citric acid or polyvinyl acid with oxalic acid or a mixture of citric and oxalic acid being particularly suitable. Oxalic acid improves handling properties of reaction slurry. The reaction without oxalic acid tends to have insufficient carbon after firing. The reaction slurry without oxalic acid becomes thick and viscous as shown in photo's to right when heated on a hot plate; this has implications on the ease of drying of the material. Polyvinyl alcohol is also a suitable carbon source.

Organic acids are preferred with citric acid monohydrate ($C_6H_8O_7$—$H_2O$) and oxalic acid dihydrate ($H_2C_2O_4$-$2H_2O$) being particularly preferred.

A particularly suitable drying method for demonstration of the invention incorporates a heated drum dryer comprising a heated drum, preferably an internally heated drum, with an alternate heat source such as infrared, laser heat or UV heater external to the drum. The alternate heat source spot heats the material on the surface opposite the drum to change properties or cause a reaction at a certain material dryness.

Thin film drying can be accomplished as a batch process by drying the product with conduction from a surface with a temperature of about 150-250° C. The material remains affixed to the surface for a time of about a ms to seconds before being scraped off the surface. This allows the material to become crystalline and not sticky after drying. In this process, additional waters of hydration are removed and some partial reactions, such as oxalate decompositions and iron phosphate allotrope conversions, may occur. Drum drying is a continuous variation of thin film drying with similar behavior.

Evaporative drying in a tray results in similar behavior to the thin film drying methods. The slurry is dried in a reactor on a beaker while mixing at about 90° C. until "muddy" then the mud is transferred to a drying convection oven overnight at about 90° C. The crystallinity is similar to the thin film drying, based on X-ray Diffraction (XRD), and the product behavior has similar electrochemical properties. This low temperature crystallinity indicates that the crystallinity is formed over time at about 90° C. temperature.

Spray drying into a relatively low temperature drying air atmosphere results in a powdered material. While not bound by theory, it is hypothesized that staying below the glass transition temperature Tg of some of the components of the mixture suitable powder can be obtained. An inlet temperature of about 150-180° C. and outlet temperature of about 110-130° C. is suitable for demonstration of the invention.

The dried powder comprising metal phosphate, lithium source and carbon source is fired to obtain the LMP/C, and preferably $LiFePO_4$/C. A calcining temperature of 580-700° C. under inert gas is preferred. Above about 740° C. $Fe_3P$ impurity can be observed. Firing, or calcining, of the powder at about 600° C., preferably for 1-10 hours and optionally under $N_{2(g)}$ is exemplary for demonstrating the invention. Below about 1 hour calcining may be incomplete. Beyond about 10 hours the phosphate begins to degrade. A calcining time of about 4 hours to about 10 hours is preferable. It is preferable that the inert gas comprise less than 0.01 wt % oxygen.

Lithium oxalate decomposes in the range of 556-585° C. though it partly decomposes to $Li_2CO_3$. By converting $Li_2CO_3$ to lithium oxalate, the decomposition can be effected in the temperature range that LFP is fired within a preferred range of 580-700° C. The Fe in LFP likely catalyzes the decomposition of $Li_2CO_3$ and lithium oxalate in this temperature window as well.

Lower temperature firing, such as about 600° C., may allow a metal rotary kiln to be used instead of roller hearth with saggars without resulting in metal contamination of product and better product quality due to an increase in gas exposure to the powder.

Optimum firing is between 580 and 700° C. for a time of between 4 and 10 hours. Firing time is a more important parameter than temperature in determining production cost as this is the limiting factor in furnace throughput.

Decomposition products are not necessarily monitored since the primary decomposition products are gases at calcining temperature. Expected decomposition products include $CO_2$, CO and $H_2O$.

Primary particle sizes achieved by the synthesis are typically about 200 to 400 nm in diameter with a sufficiently uniform particle size distribution.

Ball milling is not preferred as it compacts a fraction of the particles and results in a very polydisperse particle size distribution. Ball milling also results in a high surface area material which is not typically desired in the end product for lithium ion batteries though it may be useful for other applications such as capacitors.

Wet bead milling with moderate energy input and short residence time is particularly preferred to make high quality LFP. Wet milling with 1-1.2 mm zirconia beads, at a residence time about 5-10 min/kg is suitable for demonstration of the invention.

Tip speed can be as low as 10-15 m/s, which is lower than typically used for this type of operation, thereby being more energy efficient than operation at higher tip speed. The slow tip speed also reduces wear and tear on the beads and machine. Lower tip speed also reduces contamination of the product by grinding bead destruction. The tip speed of a wet bead mill is approximately constant as the wet bead mill is scaled up to commercial scale units.

It is preferable to rotate the powder while calcining or firing. Firing the material in a saggar results in gradients of material quality through the saggar due to each unit volume of the sagger experiencing different temperature and atmosphere histories during the firing cycle. This results in material with an average performance below optimal. Large differences in carbon content are observed between the top, middle and bottom of the saggar, especially at deep sagger loadings. To produce uniform high-quality material, the ideal firing method includes a method to agitate the material as it is fired. This can be accomplished practically in a rotary kiln or in a rotating ceramic or metal capsule with open ends and a geometry to contain the material as it rotates in the kiln.

The calcined powder can be segmented by size such as the use of sievers or by jet milling if desired.

Similar electrochemical capacity is obtained by material fired in a rotary capsule compared to saggar fired material. The capsule is found to have more uniform properties, and theoretically the capsule material is expected be able to achieve higher overall performance when optimally fired.

The reaction of the iron salt and phosphate salt can be done in inert gas to prevent oxidation of Fe(II). For the purposes of the instant invention an inert gas is defined as a gas which will not oxide Fe(II). Suitable gases include, without limit, $N_2$ and noble gases. $N_2$, preferably with less than 0.01 wt % oxygen, is particularly preferred due to the relative low cost and wide spread availability.

Throughout the description a stoichiometric amount refers to the addition of a reactant in an amount sufficient to form the resulting product in the proper stoichiometry within experimental error. A stoichiometric amount, as defined herein, is at least within 5 mole % of the theoretical stoichiometric equivalent desired and preferably within 1 mole % of the theoretical stoichiometric amount desired. By way of example a stoichiometric equivalent of lithium and phosphate would preferably have a molar ratio of lithium to phosphate from 0.95:1 to 1.05:1 and preferably from 0.99:1 to 1.01:1.

The process is easily scalable for large scale manufacturing using presently available equipment and/or innovations of the present industrial equipment. The inventive cathode is incorporated into a battery wherein the battery comprises an anode, which is not limited herein, a separator, which is not limited herein, and a dielectric, which is not limited herein. The formation of a battery from an inventive cathode as described herein, an anode, a separator and a dielectric is well known to those of skill in the art and further elaboration is not necessary herein.

Example

Figure 2:
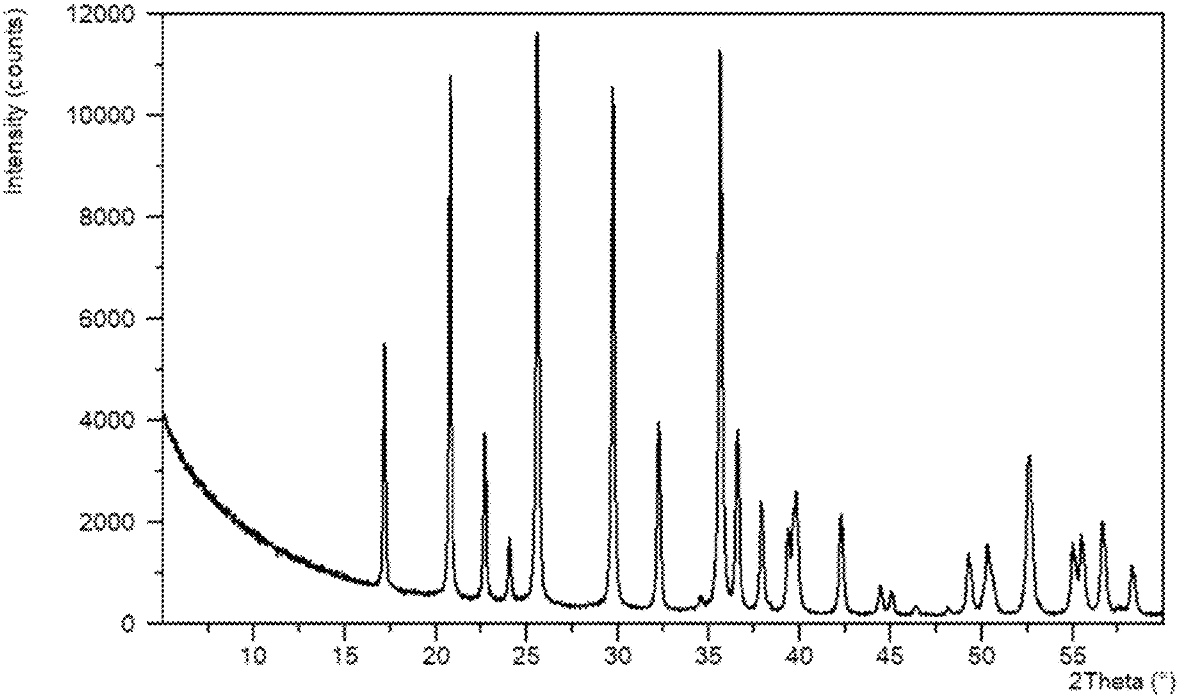
FIG. 2 is an XRD pattern of fired material.
Figure 3:
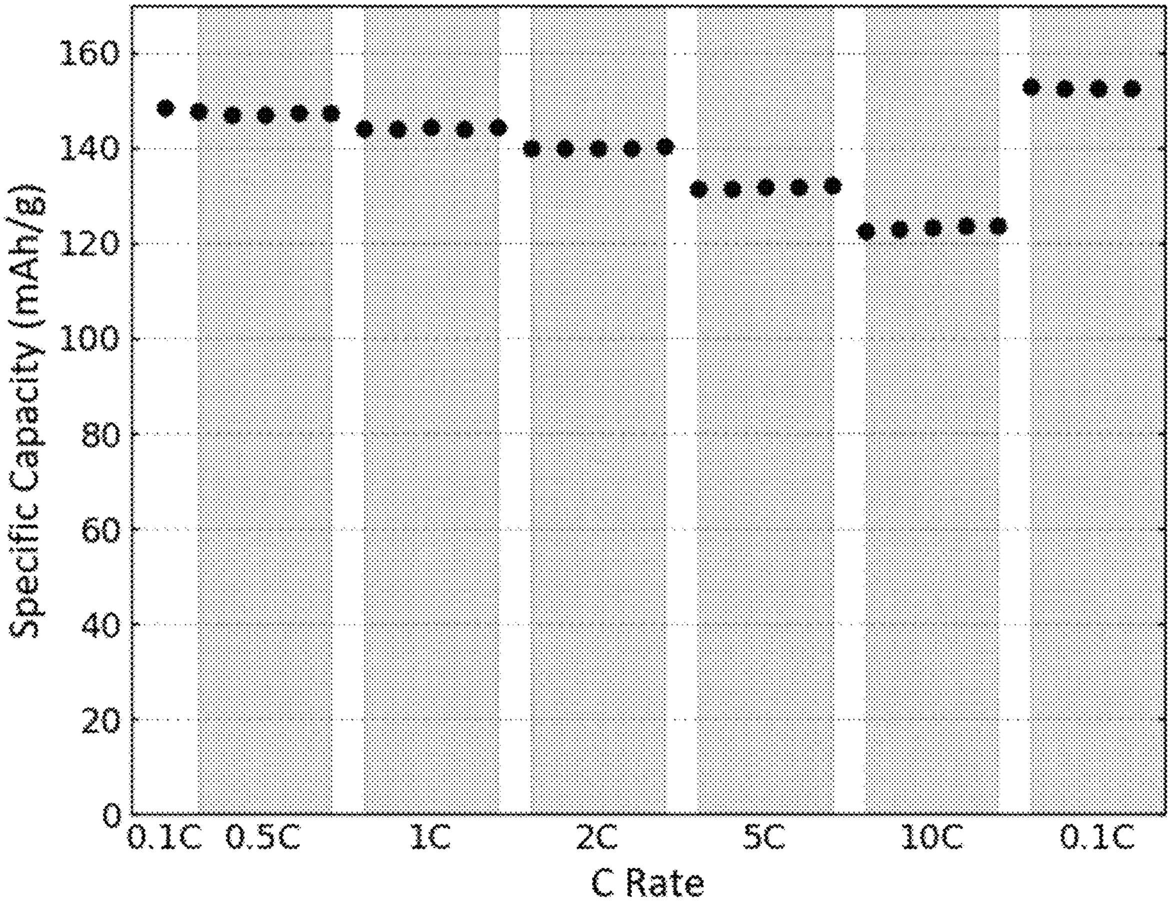
FIG. 3 is a graphical representation of the rate capability test in half cells from C/10 to 10C.
Figure 4:
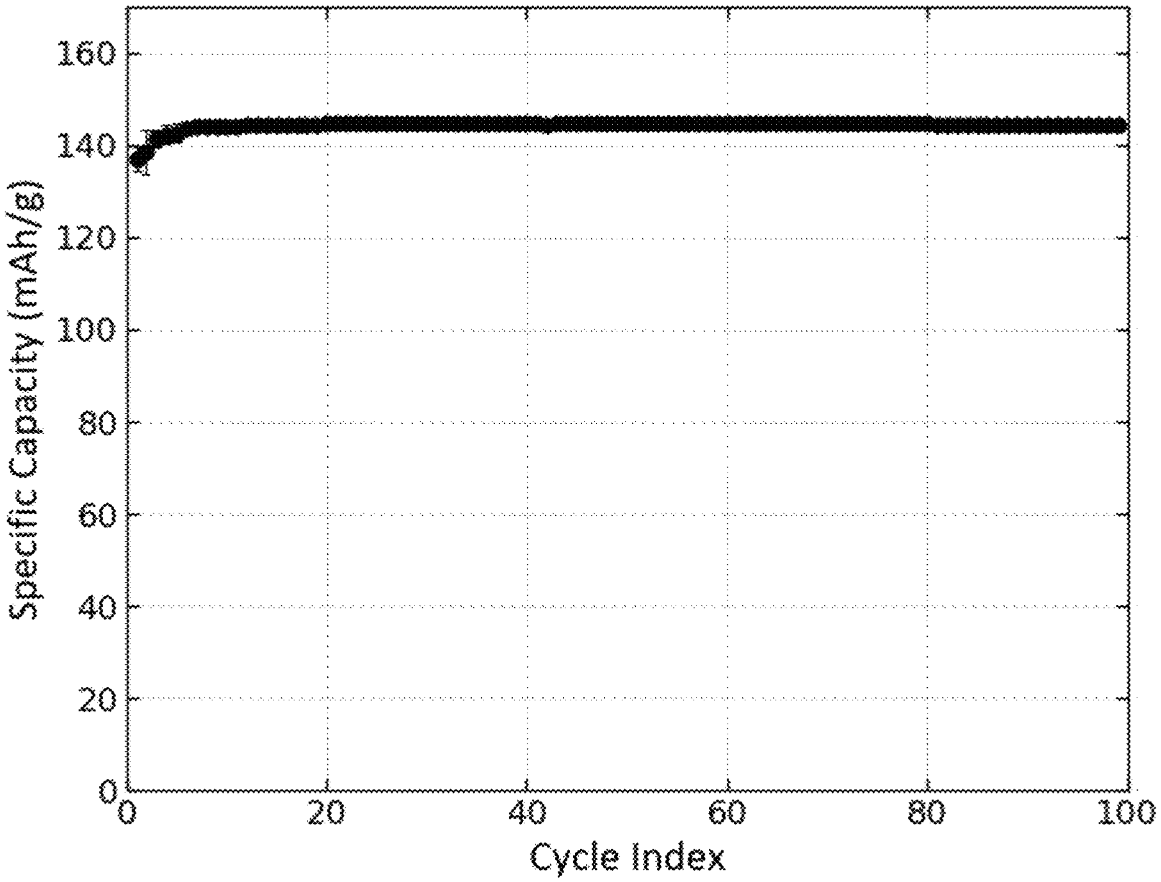
FIG. 4 is a graphical representation of 1C cycling in half cells up to 100 cycles.
Figure 5:
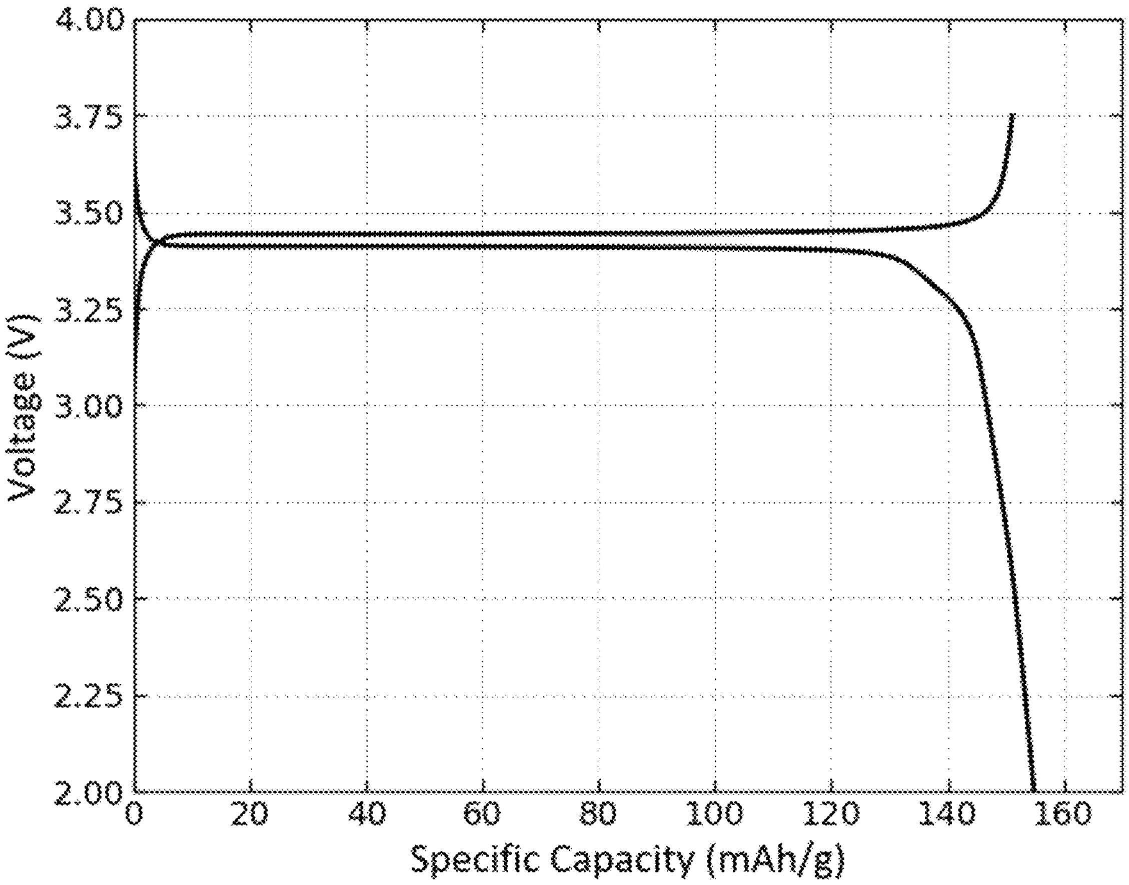
FIG. 5 is a graphical representation of the $1^{st}$ charge and discharge voltage profile in half cell at C/10 rate.
Figure 6:
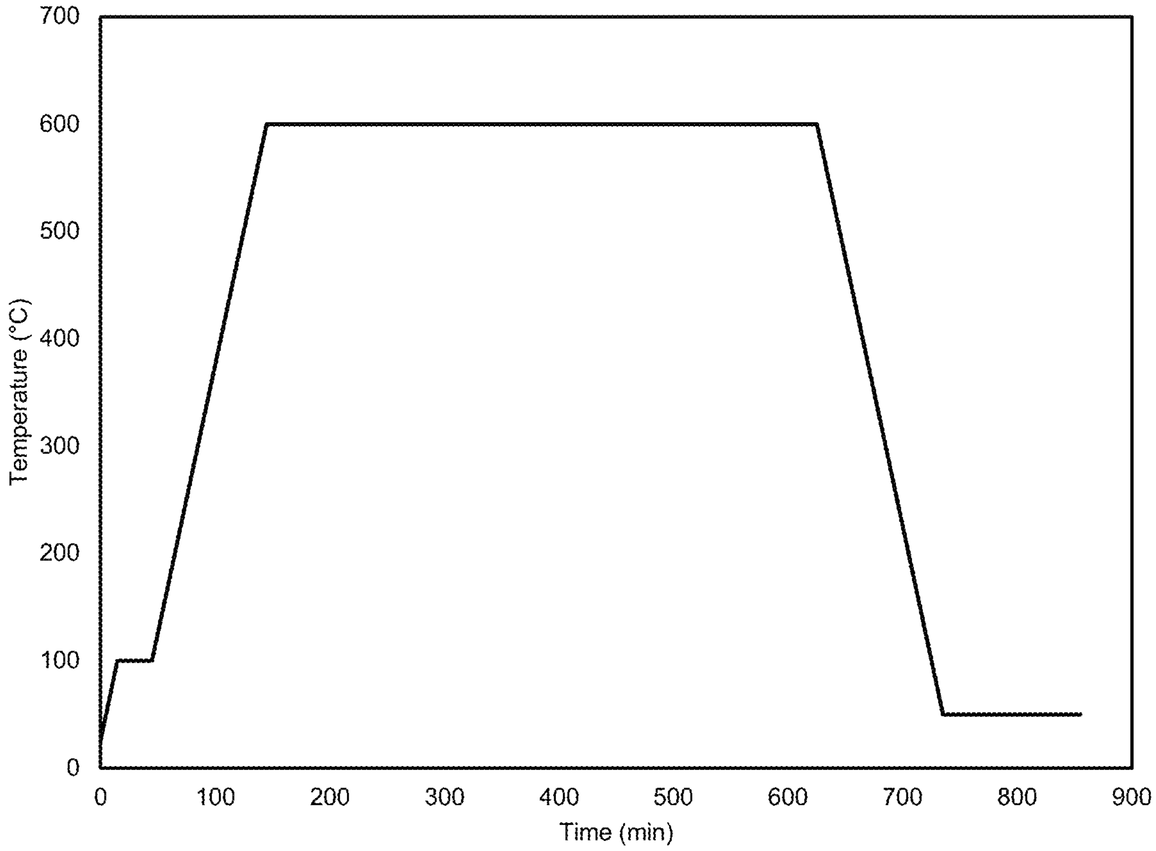
FIG. 6 is a graphical representation of a representative firing profile.

A precursor to $LiFePO_4/C$ was prepared by adding 28.00 g of zero valent iron metal powder to 196 g of a 25 wt % solution of $H_3PO_4$ in deionized water. The mixture was stirred using an overhead mixer in a 2 L glass jacketed reactor at 20° C. 12.61 g of $H_2C_2O_4 \cdot 2H_2O$ was added to the solution 15 minutes after the addition of iron metal powder, and 24.01 g of $C_6H_8O_7$ was added 20 minutes after the iron metal powder. In a separate beaker, 19.03 g of $Li_2CO_3$ was added to 250 mL of deionized water to form a suspension. This suspension was pumped dropwise to the solution in the jacketed reactor, beginning 45 minutes after the addition of iron metal powder at an addition rate of 0.38 g $Li_2CO_3$/min. The solution was then heated to 80° C. in the jacketed reactor where it reacted for 22 h. The final mixture was pumped out and spray dried to obtain the precursor powder. 9 g of the precursor powder was fired in a saggar in a quartz tube furnace under a $N_2$ atmosphere with a $N_2$ flow rate of 100 cc/min. The temperature was increased to 100° C. for a hold time of 30 minutes before being increased to 600° C. for a hold time of 8 h. A 5° C./min ramp rate was used throughout the firing process. The XRD of the precursor material, presented as a hydrate, is provided in FIG. 1. The XRD of the fired material is provided in FIG. 2. The rate capability as tested in half cells from C/10 to 10 is provided in FIG. 3. The 1C cycling in half cells up to 100 cycles is provided in FIG. 4 wherein the error bars represent standard deviation of 3 cells. The $1^{st}$ charge and discharge voltage profile in a half cell at a C/10 rate is provided in FIG. 5. A graphical representation of the temperature of the firing as a function of time is provided in FIG. 6.

TABLE 1

Summary of physical characteristics

| Material Property | Value |
|---|---|
| Carbon Content (%) | 2.3 |
| BET Surface Area ($m^2/g$) | 23 |
| Particle Size Distribution $D_{10}/D_{50}/D_{90}$ (μm) | 4.7/7.0/10.5 |

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A process for forming a lithium metal phosphate cathode material comprising:

reacting a metal source, phytic acid and an organic acid in solvent to form a metal phosphate;

adding a lithium source to said solvent;

allowing a precipitate to form;

drying said precipitate; and calcining said precipitate thereby forming said lithium iron phosphate cathode material wherein said lithium iron phosphate cathode material comprises up to 3 wt % carbon.

2. The process for forming a lithium metal phosphate cathode material of claim 1 wherein said metal source comprises zero valent metal.

3. The process for forming a lithium metal phosphate cathode material of claim 2 wherein said zero valent metal is selected from the group consisting of Fe, Mn, Ni and Co.

4. The process for forming a lithium metal phosphate cathode material of claim 1 wherein said metal source comprises elemental iron or an alloy comprising iron.

5. The process for forming a lithium metal phosphate cathode material of claim 1 wherein said alloy comprising iron is steel.

6. The process for forming a lithium metal phosphate cathode material of claim 1 wherein said solvent is water.

7. The process for forming a lithium metal phosphate cathode material of claim 1 wherein said organic acid comprises at least one carboxylic group.

8. The process for forming a lithium metal phosphate cathode material of claim 1 wherein said organic acid is selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, citric acid, isocitric acid, aconitic acid, propane-1,2,3-tricarboxylic acid, sucrose and polyvinyl acid.

9. The process for forming a lithium metal phosphate cathode material of claim 8 wherein said organic acid is selected from the group consisting of oxalic acid and citric acid.

10. The process for forming a lithium metal phosphate cathode material of claim 1 wherein said lithium iron phosphate cathode material has the formula:

$$LiFe_xNi_aMn_yCo_zPO_4 \text{ wherein } x+a+y+z=1$$

wherein:

$0 \le x \le 1$;

$0 < y \le 1$;

$0 < z \le 1$; and $0 < a \le 0.1$.

11. The process for forming a lithium metal phosphate cathode material of claim 10 wherein said $0.5 \le x \le 1$.

12. The process for forming a lithium metal phosphate cathode material of claim 11 wherein said $0.9 \le x \le 1$.

13. The process for forming a lithium metal phosphate cathode material of claim 10 wherein said $0 \le y \le 0.5$.

14. The process for forming a lithium metal phosphate cathode material of claim 10 wherein said $0 \le z \le 0.5$.

15. The process for forming a lithium metal phosphate cathode material of claim 1 wherein said carbon is a coating.

16. The process for forming a lithium metal phosphate cathode material of claim 1 comprising at least 1 wt % carbon.

17. The process for forming a lithium metal phosphate cathode material of claim 16 comprising no more than 2.5 wt % carbon.

18. The process for forming a lithium metal phosphate cathode material of claim 17 comprising 1.4 to 1.7 wt % carbon.

19. The process for forming a lithium metal phosphate cathode material of claim 1 wherein said drying is selected from thin film drying and evaporative drying.

20. The process for forming a lithium metal phosphate cathode material of claim 19 wherein said evaporative drying comprises spray drying at an inlet temperature of 150° C. to 180° C.

21. The process for forming a lithium metal phosphate cathode material of claim 19 wherein said thin film drying comprises drying in a drum dryer wherein said drum dryer comprises a heated drum and an alternate heat source external to said drum.

22. The process for forming a lithium metal phosphate cathode material of claim 21 wherein said alternate heat source is selected from infrared, laser heat and UV heat.

23. The process for forming a lithium metal phosphate cathode material of claim 1 wherein said calcining is at a temperature of 580° C. to 700° C.

24. The process for forming a lithium metal phosphate cathode material of claim 1 wherein said calcining comprises rotating said powder during said drying.

25. The process for forming a lithium metal phosphate cathode material of claim 1 further comprising wet milling of said precipitate prior to said drying.

26. The process for forming a lithium metal phosphate cathode material of claim 25 wherein said wet milling comprises milling with 1-1.2 mm zirconia beads at a residence time of about 5-10 min/kg at a tip speed of about 10-15 m/s.

27. A process for forming a lithium metal phosphate cathode material comprising:

reacting a metal source, phytic acid and an organic acid in solvent to form a metal phosphate;

adding a lithium source to said solvent;

allowing a precipitate to form;

drying said precipitate wherein said drying is thin film drying wherein said thin film drying comprises drying in a drum drying wherein said drum drying comprises a heated drum and an alternative heat source external to said drum; and calcining said precipitate thereby forming said lithium iron phosphate cathode material wherein said lithium iron phosphate cathode material comprises up to 3 wt % carbon.

28. The process for forming a lithium metal phosphate cathode material of claim 27 wherein said metal source comprises zero valent metal.

29. The process for forming a lithium metal phosphate cathode material of claim 28 wherein said zero valent metal is selected from the group consisting of Fe, Mn, Ni and Co.

30. The process for forming a lithium metal phosphate cathode material of claim 27 wherein said metal source comprises elemental iron or an alloy comprising iron.

31. The process for forming a lithium metal phosphate cathode material of claim 27 wherein said alloy comprising iron is steel.

32. The process for forming a lithium metal phosphate cathode material of claim 27 wherein said solvent is water.

33. The process for forming a lithium metal phosphate cathode material of claim 27 wherein said organic acid comprises at least one carboxylic group.

34. The process for forming a lithium metal phosphate cathode material of claim 27 wherein said organic acid is selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, citric acid, isocitric acid, aconitic acid, propane-1,2,3-tricarboxylic acid, sucrose and polyvinyl acid.

35. The process for forming a lithium metal phosphate cathode material of claim 34 wherein said organic acid is selected from the group consisting of oxalic acid and citric acid.

36. The process for forming a lithium metal phosphate cathode material of claim 27 wherein said lithium iron phosphate cathode material has the formula:

$$LiFe_xNi_aMn_yCo_zPO_4 \text{ wherein } x+a+y+z=1$$

wherein:

$0 \le x \le 1$;

$0 < y \le 1$;

$0 < z \le 1$; and $0 < a \le 0.1$.

37. The process for forming a lithium metal phosphate cathode material of claim 36 wherein said $0.5 \le x \le 1$.

38. The process for forming a lithium metal phosphate cathode material of claim 37 wherein said $0.9 \le x \le 1$.

39. The process for forming a lithium metal phosphate cathode material of claim 36 wherein said $0 \le y \le 0.5$.

40. The process for forming a lithium metal phosphate cathode material of claim 36 wherein said $0 \le z \le 0.5$.

41. The process for forming a lithium metal phosphate cathode material of claim 27 wherein said carbon is a coating.

42. The process for forming a lithium metal phosphate cathode material of claim 27 comprising at least 1 wt % carbon.

43. The process for forming a lithium metal phosphate cathode material of claim 42 comprising no more than 2.5 wt % carbon.

44. The process for forming a lithium metal phosphate cathode material of claim 43 comprising 1.4 to 1.7 wt % carbon.

45. The process for forming a lithium metal phosphate cathode material of claim 27 wherein said alternate heat source is selected from infrared, laser heat and UV heat.

46. The process for forming a lithium metal phosphate cathode material of claim 27 wherein said calcining is at a temperature of 580° C. to 700° C.

47. The process for forming a lithium metal phosphate cathode material of claim 27 wherein said calcining comprises rotating said powder during said drying.

48. The process for forming a lithium metal phosphate cathode material of claim 27 further comprising wet milling of said precipitate prior to said drying.

49. The process for forming a lithium metal phosphate cathode material of claim 48 wherein said wet milling comprises milling with 1-1.2 mm zirconia beads at a residence time of about 5-10 min/kg at a tip speed of about 10-15 m/s.

* * * * *